(12) United States Patent
Beall et al.

(10) Patent No.: US 11,919,801 B2
(45) Date of Patent: *Mar. 5, 2024

(54) HIGH STRENGTH, SCRATCH RESISTANT AND TRANSPARENT GLASS-BASED MATERIALS

(71) Applicant: CORNING INCORPORATED, Corning, NY (US)

(72) Inventors: George Halsey Beall, Big Flats, NY (US); Marie Jacqueline Monique Comte, Fontenay aux Roses (FR); Paulo Jorge Gaspar Marques, Herblay sur Seine (FR)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,885

(22) Filed: Jul. 12, 2023

(65) Prior Publication Data

US 2023/0348318 A1 Nov. 2, 2023

Related U.S. Application Data

(63) Continuation of application No. 17/582,581, filed on Jan. 24, 2022, which is a continuation of application
(Continued)

(51) Int. Cl.
*C03C 10/00* (2006.01)
*C03C 3/085* (2006.01)
(Continued)

(52) U.S. Cl.
CPC .......... *C03C 10/0009* (2013.01); *C03C 3/085* (2013.01); *C03C 3/091* (2013.01);
(Continued)

(58) Field of Classification Search
CPC .......... C03C 10/0009; C03C 10/0045; C03C 10/0054; C03C 21/002; C03C 3/085; C03C 3/091; C03C 3/093; C03C 4/0092
See application file for complete search history.

(56) References Cited

U.S. PATENT DOCUMENTS 3,252,811 A 5/1966 Beall
3,313,609 A * 4/1967 Megles ............... C03C 10/0045
501/6

(Continued)

FOREIGN PATENT DOCUMENTS

CN 101279818 A 10/2008
CN 102089252 A 6/2011
(Continued)

OTHER PUBLICATIONS

G. H. Beall, B. R. Karstetter, and H. L. Rittler "Crystallization and Chemical Strengthening of Stuffed-Quartz Glass-Ceramics," Journal of the American Ceramic Society vol. 50, No. 4 (Apr. 1967).
(Continued)

*Primary Examiner* — Travis M Figg
(74) *Attorney, Agent, or Firm* — Russell S. Magaziner

(57) ABSTRACT

Embodiments of a transparent glass-based material comprising a glass phase and a second phase that is different from and is dispersed in the glass phase are provided. The second phase may comprise a crystalline or a nanocrystalline phase, a fiber, and/or glass particles. In some embodiments, the second phase is crystalline. In one or more embodiments, the glass-based material has a transmittance of at least about 88% over a visible spectrum ranging from about 400 nm to about 700 nm and a fracture toughness of at least about 0.9 MPA·m$^{1/2}$, and wherein a surface of the glass-based material, when scratched with a Knoop diamond at a load of at least
(Continued)

5 N to form a scratch having a width w, is free of chips having a size of greater than 3 w.

20 Claims, 15 Drawing Sheets

Related U.S. Application Data

No. 15/077,036, filed on Mar. 22, 2016, now Pat. No. 11,267,747.

(60) Provisional application No. 62/186,547, filed on Jun. 30, 2015, provisional application No. 62/137,345, filed on Mar. 24, 2015.

(51) Int. Cl.
  *C03C 3/091* (2006.01)
  *C03C 3/093* (2006.01)
  *C03C 4/00* (2006.01)
  *C03C 21/00* (2006.01)

(52) U.S. Cl.
  CPC ............ *C03C 3/093* (2013.01); *C03C 4/0092* (2013.01); *C03C 10/0045* (2013.01); *C03C 10/0054* (2013.01); *C03C 21/002* (2013.01)

(56) References Cited

U.S. PATENT DOCUMENTS

| | | | |
|---|---|---|---|
| 4,097,295 A | 6/1978 | Chyung et al. | |
| 4,126,476 A | 11/1978 | Grossman | |
| 4,455,160 A | 6/1984 | Rittler | |
| 4,519,828 A | 5/1985 | Beall et al. | |
| 5,652,188 A * | 7/1997 | Chyung | C04B 35/62655 501/88 |
| 5,744,208 A | 4/1998 | Beall et al. | |
| 6,248,678 B1 * | 6/2001 | Pinckney | C03C 10/0045 501/69 |
| 7,875,565 B1 * | 1/2011 | Pinckney | C03C 3/087 89/36.02 |
| 7,964,262 B2 * | 6/2011 | Brocheton | B01D 46/24491 428/116 |
| 8,043,706 B2 * | 10/2011 | Goto | C03C 10/0045 428/432 |
| 8,187,987 B2 * | 5/2012 | Amin | C03C 3/093 501/72 |
| 8,312,739 B2 | 11/2012 | Lee et al. | |
| 8,445,394 B2 * | 5/2013 | Aitken | C03C 3/087 501/67 |
| 8,561,429 B2 | 10/2013 | Allan et al. | |
| 8,854,623 B2 | 10/2014 | Fontaine et al. | |
| 11,267,747 B2 * | 3/2022 | Beall | C03C 21/002 |
| 11,739,021 B2 * | 8/2023 | Beall | C03C 10/0045 428/3 |
| 2008/0248316 A1 | 10/2008 | Goto et al. | |
| 2009/0202808 A1 | 8/2009 | Glaesemann et al. | |
| 2011/0092353 A1 * | 4/2011 | Amin | C03C 10/16 501/3 |
| 2012/0114955 A1 | 5/2012 | Almoric et al. | |
| 2013/0178353 A1 | 7/2013 | Comte et al. | |
| 2014/0134397 A1 | 5/2014 | Amin et al. | |
| 2016/0280589 A1 * | 9/2016 | Beall | C03C 21/002 |

FOREIGN PATENT DOCUMENTS

| | | |
|---|---|---|
| EP | 0099221 A1 | 1/1984 |
| GB | 1249728 A | 10/1971 |
| JP | 2001-035417 A | 2/2001 |
| JP | 2008-254984 A | 10/2008 |
| JP | 4647256 B2 | 3/2011 |
| JP | 2011-510903 A | 4/2011 |
| JP | 2011-527105 A | 10/2011 |
| JP | 5829447 B2 | 12/2015 |
| WO | 2008/130366 A1 | 10/2008 |

OTHER PUBLICATIONS

G.H. Beall and D. Duke, "Transparent glass-ceramics," Journal of Materials Science 4 (1969) 340-352.

International Search Report and Written Opinion of the International Searching Auhority; PCT/US2016/023654; dated May 30, 2016.

Japanese Patent Application No. 2017-549701, Office Action dated Jul. 7, 2021, 5 pages (2 pages of English Translation and 3 pages of Original Document), Japanese Patent Office.

Japanese Patent Application No. 2017-549701, Office Action dated Jan. 20, 2021, 8 pages (4 pages of Original Document and 4 page of English Translation), Japanese Patent Office.

T. Berthier et al., "Mechanical Properties and Impact Resistance of a New Transparent Glass-Ceramic" Advanced Engineering Materials, 2007, 9, No. 3 191-196.

* cited by examiner

HIGH STRENGTH, SCRATCH RESISTANT AND TRANSPARENT GLASS-BASED MATERIALS

CROSS-REFERENCE TO RELATED APPLICATIONS

This application is a continuation of U.S. application Ser. No. 17/582,581, filed on Jan. 24, 2022, which is a continuation of U.S. application Ser. No. 15/077,036, filed on Mar. 22, 2016, which issued on Mar. 8, 2022 as U.S. Pat. No. 11,267,747, which claims the benefit of priority under 35 U.S.C. § 119 of U.S. Provisional Application Ser. No. 62/186,547 filed on Jun. 30, 2015 and U.S. Provisional Application Ser. No. 62/137,345 filed on Mar. 24, 2015, the contents of which are relied upon and incorporated herein by reference in their entirety.

BACKGROUND

The disclosure relates to transparent glass-based materials exhibiting improved fracture toughness and scratch resistance.

Known glass-based materials exhibiting improved flexural strength often rely on post-processing such as chemical strengthening and thermal strengthening. Such chemically strengthened and thermal strengthening. Such chemically strengthened glasses have been widely used in electronic devices including hand-held displays and tablets. Other strength performance (e.g., modulus of rupture and fracture toughness) and scratch resistance of these glass-based materials may be limited. Known glass-based materials that exhibit improved modulus of rupture or fracture toughness and scratch resistance are generally opaque. Accordingly, there is a need for a transparent material that exhibits improved fracture toughness and scratch resistance over known glass-based materials.

SUMMARY

Embodiments of a transparent glass-based material comprising a glass phase and a second phase that is different from and is dispersed in the glass phase are provided. The second phase may comprise a crystalline or a nanocrystalline phase, a fiber, and/or glass particles. In some embodiments, the second phase is crystalline. The glass-based material has a high modulus and fracture toughness and is scratch resistant. In some embodiments, the material can be chemically strengthened. For example, such materials may be ion exchangeable.

Accordingly, one aspect of the disclosure is to provide a glass-based material. The glass-based material comprises a glass phase and a second phase that is different than the glass phase and dispersed within the glass phase. The glass-based material has a transmittance of at least about 88%/mm over a visible spectrum ranging from about 400 nm to about 700 nm and a fracture toughness of at least about 0.9 MPa·m$^{1/2}$. When scratched with a Knoop diamond at a load of at least 5 N to form a scratch having a width w, a surface of the glass-based material is free of chips having a size of greater than 3 w.

A second aspect of the disclosure is to provide a glass-based material comprising a glass phase and a second phase that is different than the glass phase and dispersed within the glass phase. The glass-based material having a transmittance of at least about 88%/mm over a visible spectrum ranging from about 400 nm to about 700 nm and a fracture toughness ($K^{1C}$) of at least about 0.9 MPa·m$^{1/2}$. The glass phase has a first index of refraction and the second phase has a second index of refraction, and the difference between the first index of refraction and the second index of refraction is less than about 0.025. The second phase of the glass-based material comprises particles having a mean size in a range from 5 nm to 200 nm, and the volume fraction of the second phase in the glass-based material is in a range from 10% to about 98%.

A third aspect of the disclosure is to provide a glass-based material comprising a glass phase and a second phase that is different than the glass phase and dispersed within the glass phase. The glass-based material having a transmittance of at least 88%/mm over a visible spectrum ranging from about 400 nm to about 700 nm, a toughness of at least about 0.9 MPa·m$^{1/2}$ or at least about 0.9 MPa·m$^{1/2}$, a coefficient of thermal expansion of less than about 45×10$^{-7}$ K$^{-1}$, and a Young's modulus (E) in a range from about 80 GPa to about 100 GPa.

These and other aspects, advantages, and salient features will become apparent from the following detailed description, the accompanying drawings, and the appended claims.

DETAILED DESCRIPTION

Figure 1:
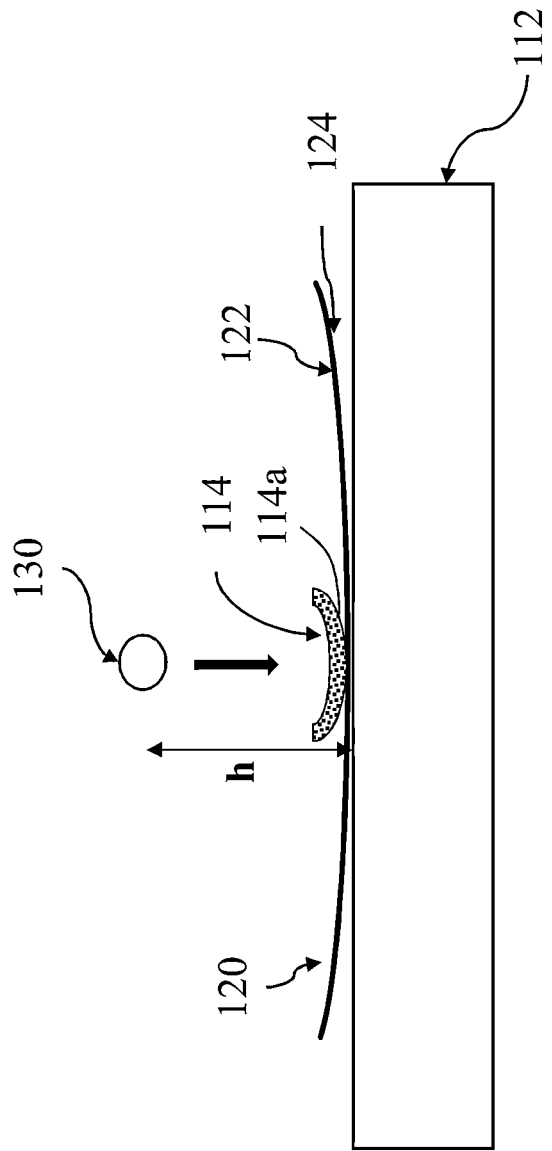
FIG. 1 is a schematic cross-sectional view of prior art apparatus that is used to perform ball drop testing.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "glass article" and "glass articles" are used in their broadest sense to include any object made wholly or partly of glass or the glass-based materials described herein. Unless otherwise specified, all compositions are expressed in terms of mole percent (mol %). Coefficients of thermal expansion (CTE) are expressed in terms of $10^{-7}$° C. and represent a value measured over a temperature range from about 20° C. to about 300° C., unless otherwise specified.

As used herein, the term "liquidus temperature," or "$T^L$" refers to the temperature at which crystals first appear as a molten glass cools down from the melting temperature, or the temperature at which the very last crystals melt away as temperature is increased from room temperature. As used herein, the term "165 kP temperature" or "$T^{165kP}$" refers to the temperature at which the glass or glass melt has a viscosity of 160,000 Poise (P), or 160 kiloPoise (kP). As used herein, the term "35 kP temperature" or "$T^{35kP}$" refers to the temperature at which the glass or glass melt has a viscosity of 35,000 Poise (P), or 35 kiloPoise (kP).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant.

Vickers crack initiation thresholds or indentation fracture threshold (IFT) described herein are determined by applying and then removing indentation load to a substrate. The IFT test is performed using an Automated Hardness Testers Tukon™ 2500 provided by Wilson® Hardness. A maximum indentation load is applied and held on the substrate for 10 seconds. The indentation cracking threshold is defined at the indentation load in units of kgf of 10 indents that exhibit a radial and/or median cracks emanating from the corners of the indent impression. The maximum load is increased until the threshold is met for a given substrate. All indentation measurements are performed at room temperature and humidity.

A first aspect of this disclosure pertains to a glass-based material including a glass and a second phase that is different than the glass phase. In some embodiments, the second phase may be dispersed within the glass phase. Alternatively, the second phase may be disposed within the glass phase in a non-random fashion.

The glass phase of the glass-based material may include at least one of a soda lime glass, an alkali aluminosilicate glass, borosilicate glass, aborosilicate glass, and a lithium alumina silicate glass. In some embodiments, the glass phase may be substantially free of arsenic or antimony oxides. Exemplary glass phase compositions include $SiO_2$ in the range from about 55 mol % to about 75 mol %, $Al_2O_3$ in the range from about 10 mol % to about 20 mol %, $B_2O_3$ in the range from ab out 0 mol % to about 16 mol %, $Na_2O$ in a range from about 0 mol % to about 4 mol %, $K_2O$ in a range from about 0 mol % to about 4 mol %, $Li_2O$ in a range from about 0 mol % to about 8 mol %, MgO in a range from about 0 mol % to about 12 mol %, ZnO in a range from about 0 mol % to about 10 mol %, $ZrO_2$ in a range from about 0 mol % to about 5 mol %, and $SnO_2$ in a range from about 0 mol % to about 0.5 mol %.

One or more specific embodiments may include a glass phase having a composition including $SiO_2$ in the range from about 55 mol % to about 75 mol %, $Al_2O_3$ in the range from about 12 mol % to about 20 mol %, $B_2O_3$ in the range from about 10 mol % to about 16 mol %, $Na_2O$ in a range from about 0 mol % to about 4 mol %, $K_2O$ in a range from about 0 mol % to about 4 mol %, MgO in a range from about 4 mol % to about 12 mol %, ZnO in a range from about 4 mol % to about 10 mol %, and $SnO_2$ in a range from about 0 mol % to about 0.5 mol %. In some embodiments, the glass phase may include any one or more of $Li_2O$ in the range from about 0 mol % to about 4 mol %, SrO in the range from about 0 mol % to about 4 mol %, and CaO of about 0 mol % to about 4 mol %.

More specific glass phase compositions include $SiO_2$ in the range from about 55 mol % to about 75 mol %, $Al_2O_3$ in the range from about 10 mol % to about 16 mol %, $B_2O_3$ in the range from about 0 mol % to about 8 mol % (or from about 0 mol % to about 5 mol %), $Na_2O$ in a range from about 0 mol % to about 4 mol %, $Li_2O$ in a range from about 4 mol % to about 8 mol %, MgO in a range from about 2 mol % to about 12 mol %, ZnO in a range from about 0 mol % to about 4 mol %, $ZrO_2$ in a range from about 1 mol % to about 5 mol %, and $SnO_2$ in a range from about 0 mol % to about 0.5 mol %.

Some embodiments of glass-based material that includes a β-quartz second phase include $SiO_2$ in the range from about 55 mol % to about 75 mol %, $Al_2O_3$ in the range from about 10 mol % to about 16 mol %, $Na_2O$ in a range from about 0 mol % (or 0.2 mol %) to about 4 mol %, $Li_2O$ in a range from about 1.5 mol % to about 8 mol %, MgO in a range from about 6 mol % to about 12 mol %, $ZrO_2$ in a range from about 1 mol % to about 5 mol %, and SnO 2 in a range from about 0 mol % to about 0.5 mol %.

The second phase may be present in embodiments of the glass-based material as nanocrystals, fibers, particles or combinations thereof. Where the second phase includes nanocrystals, such nanocrystals may include at least one of diamond, carbon, and a metal. Where the second phase includes fibers, such fibers may include at least one of carbon, a ceramic, and a glass. In one or more embodiments, where the second phase is provided as particles, such particles may be amorphous (e.g., glass) or crystalline. The average largest cross-sectional dimension of the particles may have a mean size in a range from 5 nm to 200 nm.

In one or more embodiments, the second phase may include a crystalline phase. In some embodiments, the crystalline phase may include crystals having a mean crystalline size in a range from 5 nm to 200 nm, as determined from x-ray diffraction/Rietveld analysis.

In one or more embodiments, the crystalline phase may include up to 98 volume % of the glass-based materials. In some embodiments, the crystalline phase may include from about 10 volume % to about 98 volume %, from about 15 volume % to about 98 volume %, from about 20 volume % to ab out 98 volume %, from about 30 volume % to about 98 volume %, from about 40 volume % to about 98 volume %, from about 50 volume % to about 98 volume %, from about 60 volume % to about 98 volume %, from about 10 volume % to about 95 volume %, from about 10 volume % to about 90 volume %, or from about 10 volume % to about 80 volume %.

The crystalline phase may include any one or more of mullite, spinel, α-quartz, β-quartz solid solution, petalite, lithium disilicate, β-spodumene, nepheline, and alumina. In some embodiments, glass-based material includes a second crystalline phase. The second crystalline phase may include the crystalline phases described herein, and some embodiments may include either one or both nepheline and anorthite.

In one or more embodiments, the glass phase and the second phase have a minimal difference in refractive index. For example, the difference in refractive index between the glass phase and the second phase may be less than about 0.025 (e.g., about 0.02 or less, about 0.015 or less, about 0.01 or less or about 0.005 or less). In some instances, the refractive index difference between the glass phase and the second phase may be greater than the values provided herein, if the crystallites are of sufficient size to provide transparency (i.e., the crystallites are sufficiently small in dimension) For example, the refractive index difference may be difference may be greater than 0.025 (e.g., up to about 0.5) if the crystallites have a major dimension of less than about 100 nm or less than about 50 nm.

The glass-based material of one or more embodiments may exhibit a transmittance of at least about 88%/mm over a visible spectrum ranging from ab out 400 nm to about 800 nm. In some embodiments, the glass-based materials exhibit a transmittance of about 90%/mm or greater, about 92%/mm or greater or about 94%/mm or greater, over the visible spectrum in the range from about 400 nm to about 800 nm.

The glass-based material may also exhibit a fracture toughness of about 0.9 MPa·m$^{1/2}$ or greater, 1.2 MPa·m$^{1/2}$ or greater (e.g., about 1.3 MPa·m$^{1/2}$ or greater, 1.4 MPa·m$^{1/2}$ or greater, 1.5 MPa·m$^{1/2}$ or greater, 1.6 MPa·m$^{1/2}$ or greater, or 17 MPa·m$^{1/2}$ or greater). The fracture toughness may be measured using either Vickers indentation or Chevron notch indentation techniques commonly used in the art.

In one or more embodiments, the glass-based material is resistant to sharp impact and is be able to withstand direct or point impacts. Such glass-based materials do not exhibit lateral damage such as, but not limited to, chipping when scratched at a rate of 0.4 mm/s with a Knoop diamond that is oriented so that the angle between the leading and trailing edges of the tip of the Knoop diamond is 172° 30' at a load of 5 N and, in some embodiments, at a load of 10 N. As used herein, "chipping" refers to the removal or ejection of glass fragments from a surface of a glass when the surface is scratched with an object such as a stylus. As used herein, "chip" can refer to either a fragment removed during scratching of the glass-based material surface or the region on the surface from which the chip is removed. In the latter sense, a chip is typically characterized as a depression in the vicinity of the scratch. When scratched, the glass-based material described herein does not exhibit chipping (i.e., chips are not generated, or the glass is free of chips) beyond a region extending laterally on either side of the scratch track (i.e., the scratch formed by the Knoop diamond) formed for a distance d that is greater than twice the width w of the scratch and, in another embodiment, three times the width w of the scratch. In other words, chipping generated by scratching is limited to a region bordering either side of the scratch track, wherein the width of the region is no greater than twice (in some embodiment, no greater than three times) the width w of the scratch. In other words, when a surface of the glass-based material is scratched with a Knoop diamond at a load of at least 5 N to form a scratch having a width w, the resulting scratch is free of chips having a size of greater than 3 w or 2 w.

The glass-based material may exhibit a relatively low coefficient of thermal expansion. For example, in one or more embodiments, the glass-based material has a coefficient of thermal expansion of less than about $45 \times 10^{-7}$ K$^{-1}$. In some instances, the coefficient of thermal expansion may be ab out $40 \times 10^{-7}$ K$^{-1}$ or less, about $35 \times 10^{-7}$ K$^{-1}$ or less, or about $30 \times 10^{-7}$ K$^{-1}$ or less. The lower limit of the coefficient of thermal expansion may be about $15 \times 10^{-7}$ K$^{-1}$.

The glass-based material may exhibit increased Young's modulus (E), when compared to known glass materials exhibiting the same or comparable transmittance. For example, in one or more embodiments, the glass-based material may exhibit a Young's modulus (E) of greater than about 70 MPa or greater than about 75 MPa. In some instances, the Young's modulus (E) may be in the range from about 80 GPa to about 100 GPa (e.g., from about 80 MPa to about 95 MPa, from about 80 MPa to about 90 MPa, from about 85 MPa to about 100 MPa, or from about MPa to about 100 MPa).

The glass-based materials described herein demonstrate improved fracture resistance when subjected to repeated drop tests. It should be noted that the glass-based materials are provided as sheets for such testing. The purpose of such drop tests is to characterize the performance of such glass-based materials in norm al use as display windows or cover plates for handheld electronic devices such as cell phones, smart phones, and the like.

A typical ball drop test concept that is currently in use is shown in FIG. 1. The ball drop test assembly 150 includes a solid, hard substrate 112 such as a granite slab or the like and a steel ball 130 of predetermined mass and diameter. A sample 120 (e.g., a sheet of a material) is secured to the substrate 112, and a piece of sandpaper 114 having the desired grit is placed on the upper surface of the sample 120 opposite the substrate 112. The sandpaper 114 is placed on the sample 120 such that the roughened surface 114a of the sandpaper contacts the upper surface 122 of the sample 120. The steel ball 130 is allowed to fall freely from a predetermined height h onto the sandpaper 114. The upper surface 122 or compression face of the sample 220 makes contact with the roughened surface 114a of the sandpaper 114, introducing cracks into the surface of the upper surface/compression face 122. The height h may be increased incrementally until either a maximum height is reached or the glass sample fractures.

When used with glass-based samples, the ball drop test 150 described hereinabove does not represent the true behavior of glass-based materials when dropped onto and contacted by a rough surface. Instead, it is known that the face of the glass-based material bends outward in tension, rather than inward in compression as shown in FIG. 1.

Figure 2:
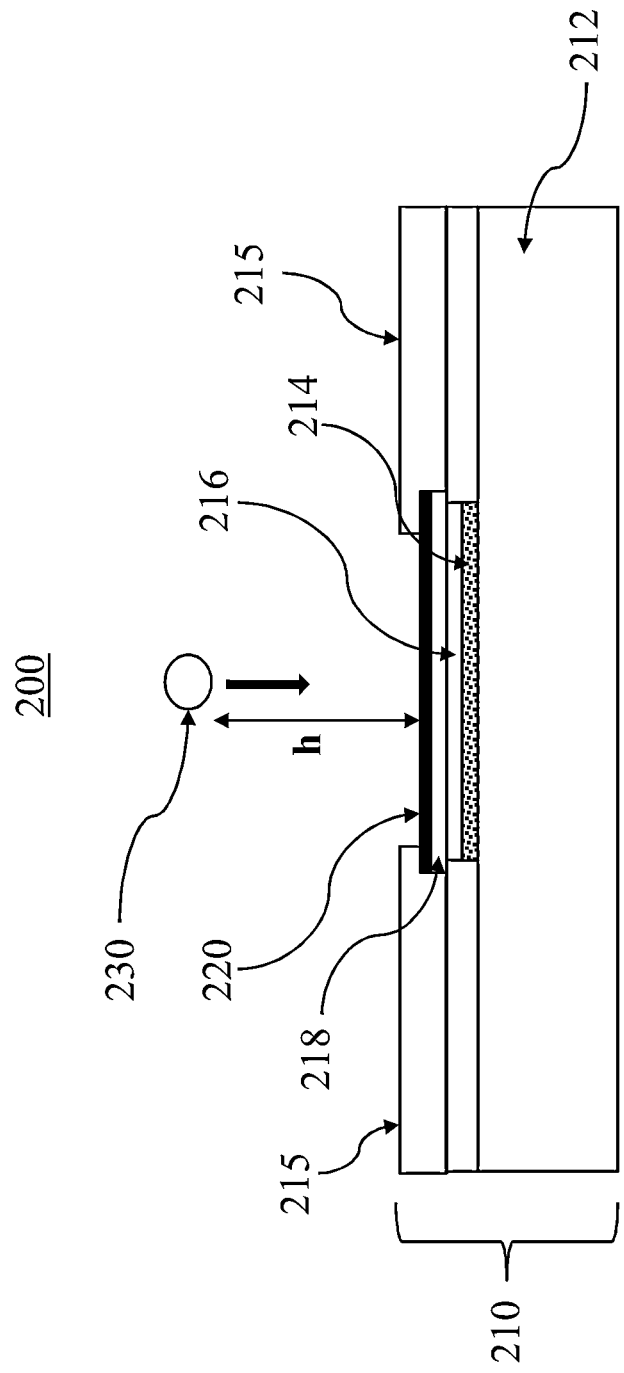
FIG. 2 is a schematic cross-sectional view of an embodiment of the apparatus that is used to perform the inverted ball on sandpaper (IBoS) test described in the present disclosure.
Figure 3:
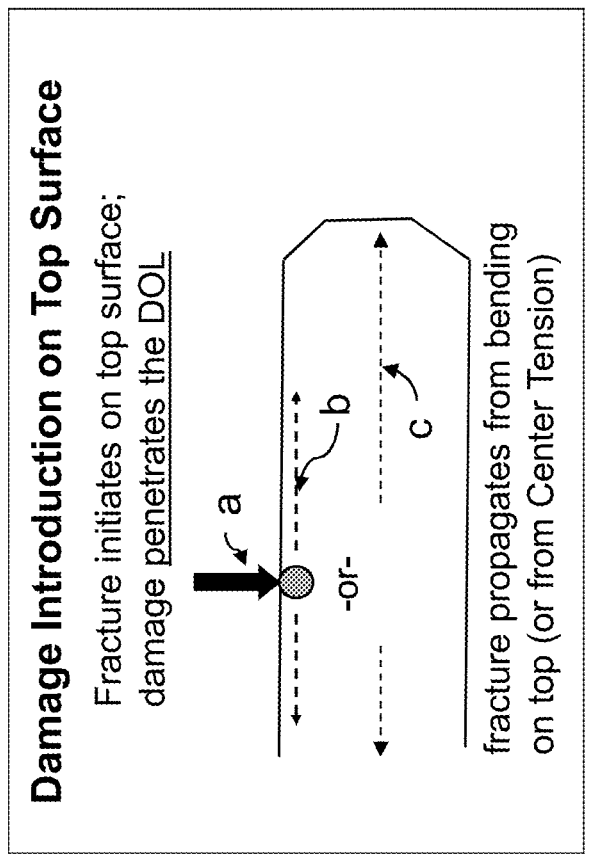
FIG. 3 is a schematic cross-sectional representation of the dominant mechanism for failure due to damage introduction plus bending that typically occurs in glass-based materials that are used in mobile or hand held electronic devices.

An inverted ball on sandpaper (IBoS) test is a dynamic component level test that mimics the dominant mechanism for failure due to damage introduction plus bending that typically occurs in glass-based materials that are used in mobile or hand held electronic devices, as schematically shown in FIG. 2. In the field, damage introduction (a in FIG. 3) occurs on the top surface of the glass-based material. Fracture initiates on the top surface of the glass-based material and damage either penetrates the glass-based material (b in FIG. 3) or the fracture propagates from bending on the top surface or from the interior portions of the glass-based material (c in FIG. 3). The IBoS test is designed to simultaneously introduce damage to the surface of the glass and apply bending under dynamic load. In some instances, the glass-based material exhibits improved drop performance when it includes a compressive stress than if the same glass-based material does not include a compressive stress.

An IBoS test apparatus is schematically shown in FIG. 2. Apparatus 200 includes a test stand 210 and a ball 230. Ball 230 is a rigid or solid ball such as, for example, a stainless steel ball, or the like. In one embodiment, ball 230 is a 4.2 gram stainless steel ball having diameter of 10 mm. The ball 230 is dropped directly onto the glass-based material sample 218 from a predetermined height h. Test stand 210 includes a solid base 212 comprising a hard, rigid material such as granite or the like. A sheet 214 having an abrasive material disposed on a surface is placed on the upper surface of the solid base 212 such that surface with the abrasive material faces upward. In some embodiments, sheet 214 is sandpaper having a 30 grit surface and, in other embodiments, a 180 grit surface. The glass-based material sample 218 is held in place above sheet 214 by sample holder 215 such that an air gap 216 exists between glass-based material sample 218 and sheet 214. The air gap 216 between sheet 214 and glass-based material sample 218 allows the glass-based material sample 218 to bend upon impact by ball 230 and onto the abrasive surface of sheet 214. In one embodiment, the glass-based material sample 218 is clamped across all corners to keep bending contained only to the point of ball impact and to ensure repeatability. In some embodiments, sample holder 215 and test stand 210 are adapted to accommodate sample thicknesses of up to about 2 mm. The air gap 216 is in a range from about 50 µm to about 100 µm. Air gap 216 is adapted to adjust for difference of material stiffness (Young's modulus, Emod), but also includes the elastic modulus and thickness of the sample. An adhesive tape 220 may be used to cover the upper surface of the glass-based material sample to collect fragments in the event of fracture of the glass-based material sample 218 upon impact of ball 230.

Various materials may be used as the abrasive surface. In a one particular embodiment, the abrasive surface is sandpaper, such as silicon carbide or alumina sandpaper, engineered sandpaper, or any abrasive material known to those skilled in the art for having comparable hardness and/or sharpness. In some embodiments, sandpaper having 30 grit may be used, as it has a surface topography that is more consistent than either concrete or asphalt, and a particle size and sharpness that produces the desired level of specimen surface damage.

Figure 4:
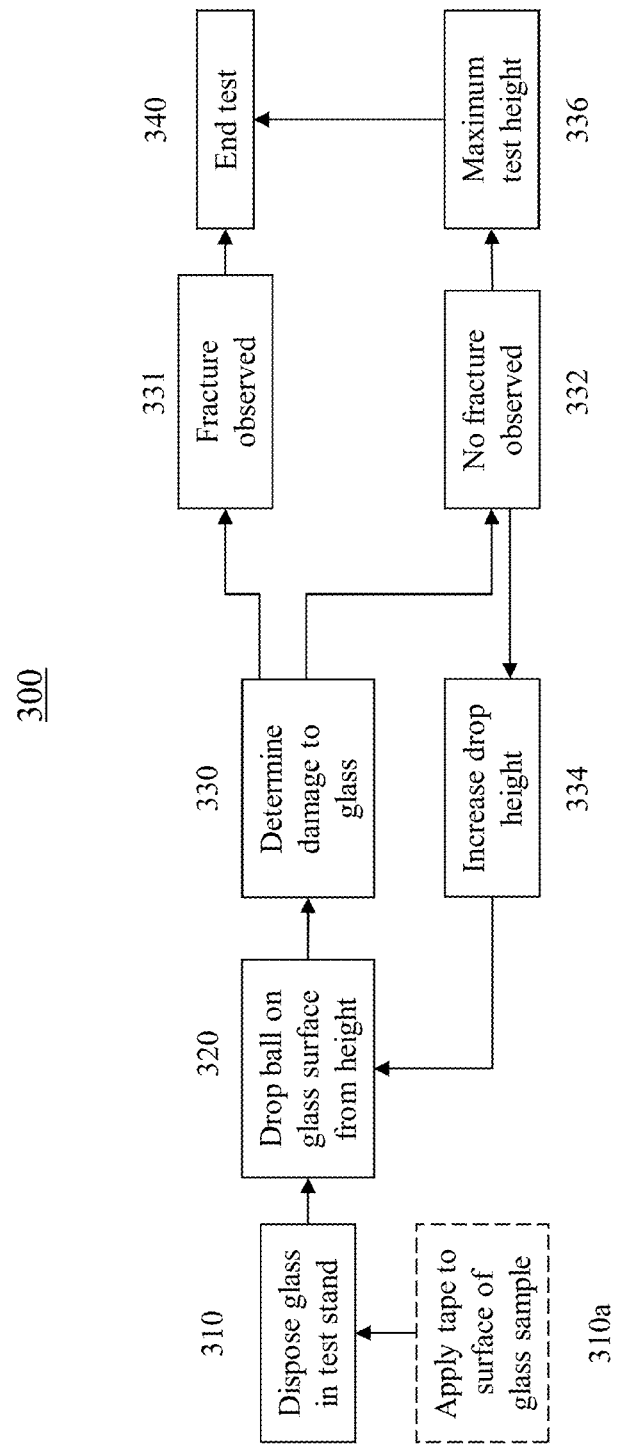
FIG. 4 is a flow chart for a method of conducting the IBoS test in the apparatus described herein.

In one aspect, a method 300 of conducting the IBoS test using the apparatus 200 described hereinabove is shown in FIG. 4. In Step 310, a glass-based material sample (218 in FIG. 2) is placed in the test stand 210, described previously and secured in sample holder 215 such that an air gap 216 is formed between the glass-based material sample 218 and sheet 214 with an abrasive surface. Method 300 presumes that the sheet 214 with an abrasive surface has already been placed in test stand 210. In some embodiments, however, the method may include placing sheet 214 in test stand 210 such that the surface with abrasive material faces upward. In some embodiments (Step 310a), an adhesive tape 220 is applied to the upper surface of the glass-based material sample 218 prior to securing the glass-based material sample 218 in the sample holder 210.

In Step 320, a solid ball 230 of predetermined mass and size is dropped from a predetermined height h onto the upper surface of the glass-based material sample 218, such that the ball 230 impacts the upper surface (or adhesive tape 220 affixed to the upper surface) at approximately the center (i.e., within 1 mm, or within 3 mm, or within 5 mm, or within 10 mm of the center) of the upper surface. Following impact in Step 320, the extent of damage to the glass-based material sample 218 is determined (Step 330). As previously described hereinabove, herein, the term "fracture" means that a crack propagates across the entire thickness and/or entire surface of a substrate when the substrate is dropped or impacted by an object.

In method 300, the sheet 218 with the abrasive surface may be replaced after each drop to avoid "aging" effects that have been observed in rep e ate d use of other types (e.g., concrete or asphalt) of drop test surfaces.

Various predetermined drop heights h and increments are typically used in method 300. The test may, for example, utilize a minimum drop height to start (e.g., ab out 10-20 cm). The height may then be increased for successive drops by either a set increment or variable increments. The test described in method 300 is stopped once the glass-based material sample 218 breaks or fractures (Step 331). Alternatively, if the drop height h reaches the maximum drop height (e.g., about 100 cm) without fracture, the drop test of method 300 may also be stopped, or Step 320 may be repeated at the maximum height until fracture occurs.

In some embodiments, IBoS test of method 300 is performed only once on each glass-based material sample 218 at each predetermined height h. In other embodiments, however, each sample may be subjected to multiple tests at each height.

If fracture of the glass-based material sample 218 has occurred (Step 331 in FIG. 4), the IBoS test according to method 300 is ended (Step 340). If no fracture resulting from the ball drop at the predetermined drop height is observed (Step 332), the drop height is increased by a predetermined increment (Step 334)—such as, for example 5, 10, or 20 cm—and Steps 320 and 330 are repeated until either sample fracture is observed (331) or the maximum test height is reached (336) without sample fracture. When either Step 331 or 336 is reached, the test according to method 300 is ended.

When subjected to the inverted ball on sandpaper (IBoS) test described above, embodiments of the glass-based material described herein have at least about a 60% survival rate when the ball is dropped onto the surface of the glass from a height of 80 cm. For example, a glass-based material is described as having a 60% survival rate when dropped from a given height when three of five identical (or nearly identical) samples (i.e., having approximately the same composition and, when strengthened, approximately the same compressive stress and depth of compression or compressive stress layer, as described herein) survive the IBoS drop test without fracture when dropped from the prescribed height (here 80 cm). In other embodiments, the survival rate in the 80 cm IBoS test of the glass-based materials that are strengthened is at least about 70%, in other embodiments, at least about 80%, and, in still other embodiments, at least about 90%. In other embodiments, the survival rate of the strengthened glass-based materials dropped from a height of 100 cm in the IBoS test is at least about 60%, in other embodiments, at least about 70%, in still other embodiments, at least about 80%, and, in other embodiments, at least about 90%.

To determine the survivability rate of the glass-based materials when dropped from a predetermined height using the IBoS test method and apparatus described hereinabove, at least five identical (or nearly identical) samples (i.e., having approximately the same composition and, if strengthened, approximately the same compressive stress and depth of compression or layer) of the glass-based materials are tested, although larger numbers (e.g., 10, 20, 30, etc.) of samples may be subjected to testing to raise the confidence level of the test results. Each sample is dropped a single time from the predetermined height (e.g., 80 cm) or, alternatively, dropped from progressively higher heights without fracture until the predetermined height is reached, and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

The glass-based materials described herein also demonstrate improved surface strength when subjected to ring-on-ring (ROR) testing and abraded ring-on-ring (AROR) testing. ROR test is identical to the AROR test, except the sample is not abraded prior to ring-on-ring testing. The strength of a material as measured by ROR testing and AROR testing is defined as the stress at which fracture occurs. The abraded ring-on-ring test is a surface strength measurement for testing flat glass specimens, and ASTM C1499-09(2013), entitled "Standard Test Method for Monotonic Equibiaxial Flexural Strength of Advanced Ceramics at Ambient Temperature," serves as the basis for the ring-on-ring abraded ROR test methodology described herein. The contents of ASTM C1499-09 are incorporated herein by reference in their entirety. In one embodiment, the glass-based material sample is provided as a sheet and is abraded prior to ring-on-ring testing with 90 grit silicon carbide (SiC) particles that are delivered to the sample using the method and apparatus described in Annex A2, entitled "abrasion Procedures," of ASTM C158-02(2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass-based material sample is abraded as described in ASTM C158-02, Annex 2, to normalize and/or control the surface defect condition of the sample using the apparatus shown in Figure A2.1 of ASTM C158-02. The abrasive material is sandblasted onto the sample surface at a load of 15 psi using an air pressure of 304 kPa (44 psi). After air flow is established, 5 cm$^3$ of abrasive material is dumped into a funnel and the sample is sandblasted for 5 seconds after introduction of the abrasive material.

Figure 5:
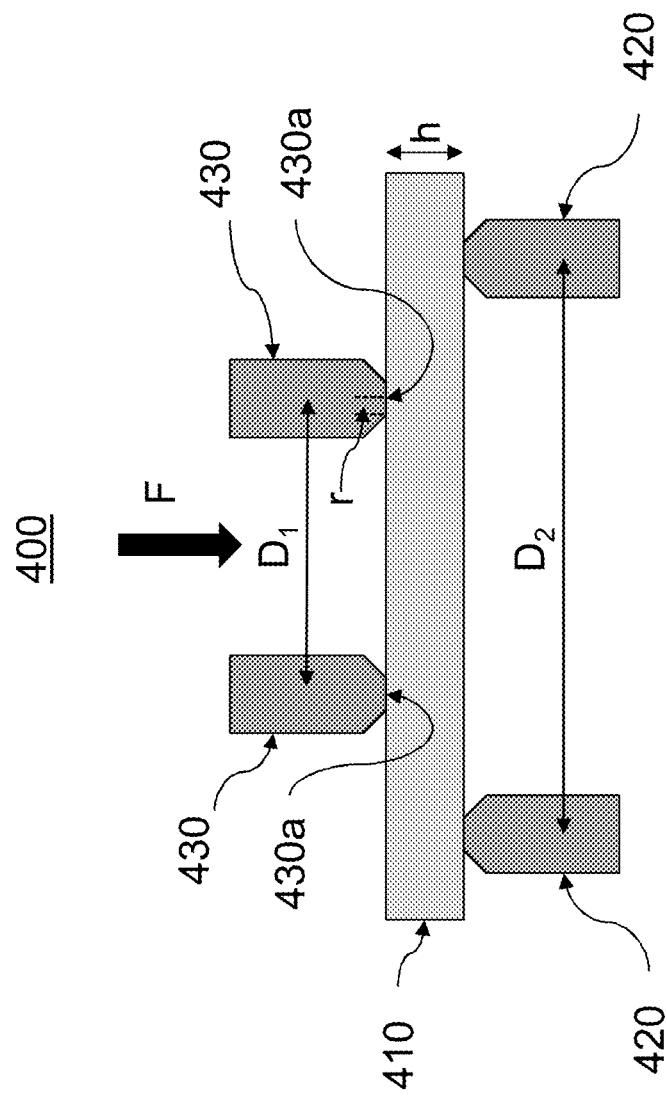
FIG. 5 is a schematic cross-sectional view of a ring-on-ring apparatus.

For the ring-on-ring test, a glass-based material sample having at least one abraded surface is placed between two concentric rings of differing size to determine equibiaxial flexural strength (i.e., the maximum stress that a material is capable of sustaining when subjected to flexure between two concentric rings), as schematically shown in FIG. 5. In the AROR configuration 400, the abraded glass-based material sample 410 is supported by a support ring 420 having a diameter $D_2$. A force F is applied by a load cell (not shown) to the surface of the glass-based material sample by a loading ring 430 having a diameter $D_1$. For ROR, the unabraded glass-based material sample 410 is supported in the same manner and force F is applied in the same manner.

The ratio of diameters of the loading ring and support ring $D_1/D_2$ may be in a range from about 0.2 to about 0.5. In some embodiments, $D_1/D_2$ is about 0.5. Loading and support rings 430, 420 should be aligned concentrically to within 0.5% of support ring diameter $D_2$. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, $h/2 \leq r \leq 3h/2$, where h is the thickness of specimen 410. Loading and support rings 430, 420 are typically made of hardened steel with hardness $HR_c > 40$. ROR fixtures are commercially available.

The intended failure mechanism for the ROR or AROR test is to observe fracture of the glass-based material sample 410 originating from the surface 430a within the loading ring 430. Failures that occur outside of this region—i.e., between the loading rings 430 and support rings 420—are omitted from data analysis. In some instances, due to the thinness and strength of the glass-based material sample 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. ROR and AROR testing therefore focuses on peak load at failure as the measured response.

The strength of glass-based materials depends on the presence of surface flaws. However, the likelihood of a flaw of a given size being present cannot be precisely predicted, as the strength of glass-based materials is statistical in nature. A Weibull probability distribution is therefore generally used as a statistical representation of the data obtained.

In some embodiments, the glass-based material described herein, when provided as a sheet, has a surface or equibiaxial flexural strength of about 250 MPa or greater or even 550 MPa or greater, as determined by AROR testing.

The values provided herein the surface or equibiaxial flexural strength of the glass-based materials, as determined by AROR testing, and the survival rate of the glass-based materials dropped from various heights (e.g., 80 cm or 100 cm) in the IBoS test are with respect to a glass-based material having a sheet form and a thickness in the range from about 0.1 mm to about 2 mm.

It should be understood that the shape and the dimensions (e.g., thickness) of the glass-based materials may vary. In one or more embodiments, the glass-based material may be substantially planar or sheet-like. The glass-based material may also be curved or otherwise shaped or sculpted. Additionally or alternatively, the physical thickness of the glass-based material may vary along one or more of its dimensions for aesthetic and/or functional reasons. For example, the edges of the glass-based material may be thicker as compared to more central regions. The length, width and physical thickness dimensions of the glass-based material may also vary according to the application or use. For example, the glass-based material may be a sheet having a thickness in the range from about 100 µm to about 2 mm. Exemplary thicknesses range from about 100 µm to about 1 mm (e.g., 100, 200, 300, 400, 500, 600, 700, 800, 900 or 1000 µm). The glass-based material may have a physical thickness greater than about 1 mm (e.g., about 2, 3, 4, or 5 mm). The glass-based material may be acid polished or otherwise treated to remove or reduce the effect of surface flaws.

The glass-based material may be provided using a variety of different processes. For instance, various forming methods can include float glass or rolling processes and down-draw processes such as fusion draw and slot draw. In some embodiments, the glass-based materials may be described as down-drawable by processes known in the art, such as slot-drawing, fusion drawing, re-drawing, and the like, and have a liquidus viscosity of at least 130 kilopoise.

Once formed, the glass-based material may be strengthened by one or more processes. Exemplary processes include chemically strengthening processes (e.g., ion-exchange process in which larger ions are exchanged for smaller ions in the surface of the material), thermal strengthening processes (e.g., thermal tempering) and the use of a mismatch of the coefficient of thermal expansion between the glass-based material and another material to create regions with compressive stress (CS) and regions with tensile stress or central tension (CT).

Where the glass-based material is chemically strengthened by an ion exchange process, the ions in the surface layer of the glass-based material are replaced by—or exchanged with—larger ions having the same valence or oxidation state. Ion exchange processes are typically carried out by immersing a glass-based material in one or more molten salt baths containing the larger ions to be exchanged with the smaller ions in the glass-based material. It will be appreciated by those skilled in the art that parameters for the ion exchange process, including, but not limited to, bath composition and temperature, immersion time, the number of immersions of the glass-based material in a salt bath (or baths), use of multiple salt baths, additional steps such as annealing, washing, and the like, are generally determined by the composition of the glass-based material and the desired CS, depth of compressive stress layer (DOL) or depth of compression (DOC). By way of example, ion exchange of glass-based materials may be achieved by immersion in at least one molten bath containing a salt such as, but not limited to, nitrates, sulfates, and chlorides of the larger alkali metal ion. Depending on the composition of the glass-based material, the bath(s) may include molten alkali salts, such as lithium salt, sodium salt, and/or potassium salt. In some embodiments, the bath(s) may include $LiNO_3$, $LiCl$, $Li_2SO_4$, $KNO_3$, $KCl$, $K_2SO_4$, $NaNaO$, $NaSO_4$, $CaNitrate$, $KNO_3$ and other similar compositions or combinations thereof in molten form. In one or more embodiments, the molten salt bath includes a mixture of 90% (by weight) $Li_2SO_4$-10% $K_2SO_4$. The temperature of the molten salt bath typically is in a range from 300 up to about 900° C. while immersion times range from about 15 minutes up to about 40 hours. The temperature depends on the salt bath composition. It should be noted that such temperatures may reach about 700° C. and, due to the corrosion at such high temperatures, the molten salt baths may be contained in platinum vessels. The bath composition, bath temperature and immersion times may differ from those described above.

In some embodiments, the glass-based material may be subjected to ion exchange with silver, copper, or other elements, to impart other properties or to lower the melting temperature of salt bath mixture.

In addition, non-limiting examples of ion exchange processes in which glass-based materials are immersed in multiple ion exchange baths, with washing and/or annealing steps between immersions, are described in U.S. patent application Ser. No. 12/500,650, filed Jul. 10, 2009, by Douglas C. Allan et al., entitled "Glass with Compressive Surface for Consumer Applications" and claiming priority from U.S. Provisional Patent Application No. 61/079,995, filed Jul. 11, 2008, in which glasses are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glasses are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

The degree of chemical strengthening achieved by ion exchange may be quantified based on the parameters of CT, surface CS, and DOL or DOC. Compressive stress and depth of layer are measured using those means known in the art. Such means include, but are not limited to, measurement of surface stress (FSM) using refractive near-field (RNF) measurements as described in U.S. Pat. No. 8,854,623B2, entitled "Systems and methods for measuring a profile characteristic of a glass sample", which is incorporated herein in its entirety.

The profile can be non-linear, error function etc. In various sections of the disclosure, CT and CS are expressed herein in megaPascals (MPa), physical thickness t is expressed in either micrometers (m) or millimeters (mm) and DOL or DOC is expressed in micrometers (m).

In or more embodiments, the glass-based material can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened glass-based material may have a DOL of 40 µm or greater (e.g., 45 µm, 50 µm, 60 µm, 70 µm, 80 µm, 90 µm, 100 µm, 110 µm, 120 µm, 130 µm or 140 µm or greater) and/or a CT of 50 MPa or less, 40

MPa or greater, 20 MPa or greater, or 10 MPa or greater. Without being bound by theory, the glass-based materials described herein exhibit the same CS levels as other materials (e.g., glass) and higher CT levels that such materials, without being frangible.

The glass-based materials described herein may be used in various applications. For example, the glass-based materials may be used in various glass articles such as cover plates, enclosures or housings for consumer electronic products to protect critical devices within the product, to provide a user interface for input and/or display, and/or many other functions. Such consumer electronic products include mobile devices, such as smart phones, mp3 players and computer tablets. As used herein, the terms "enclosure," "cover plate," and "window" are used interchangeably and refer to articles, including windows, cover plates, screens, panels, and substrates, that form the outer portion of a display screen, window, or structure for mobile electronic devices. The glass-based materials may be used in architectural articles, transportation-related articles, appliance articles, or any article that requires transparency, scratch-resistance, fracture toughness or a combination thereof.

EXAMPLES

Various embodiments will be further clarified by the following examples.

Compositions 1-5, as set forth in Table 1, were batched and melted by placing 1000 grams of raw materials in a platinum crucible, and placing the crucible in a furnace preheated at 1500° C. The temperature in the furnace is increased to 1600° C. in 1 hour after the raw materials are introduced and the raw materials are heated at 1600° C. for 4 more hours. The melted glass is poured and rolled to a thickness of 6 mm and annealed at 650° C.

The resulting glasses from Compositions 1-5 are then cerammed according to either Ceramming Schedule A or Ceramming Schedule B to provide Glass-based Materials 1-5, respectively, as shown in Table 2. Ceramming Schedule A includes heat treating the glass at a temperature of 750° C. ("nucleation temperature" or $T_N$) for 4 hours to nucleate the glass, followed by heat treating the glass at a temperature of 775° C. ("Ceramming temperature" or $T_C$) for 2 hours to form a second phase. Ceramming Schedule B includes heat treating the glass at a temperature of 750° C. ($T_N$) for 4 hours to nucleate the glass, followed by heat treating the glass at a temperature of 830° C. ($T_C$) for 2 hours to form a second phase. The heating rate between the nucleation temperature and the ceramming temperature was 10° C./minute.

The properties of the resulting Glass-based Materials 1-5 are shown in Table 2 after being cerammed according to Ceramming Schedule A or Ceramming Schedule B. The CTE values reported in Table 2 were measured over a temperature range from about 25° C. to about 700° C. The fracture toughness values ($K_{1C}$) are measured by Vickers indentation. The resulting Glass-based Materials 1-5 were also examined using X-ray diffraction analysis and showed the presence of a second phase including crystals having a mullite structure. The mean size of the crystals, as determined by Rietveld analysis, is also included in Table 2.

Figure 6:
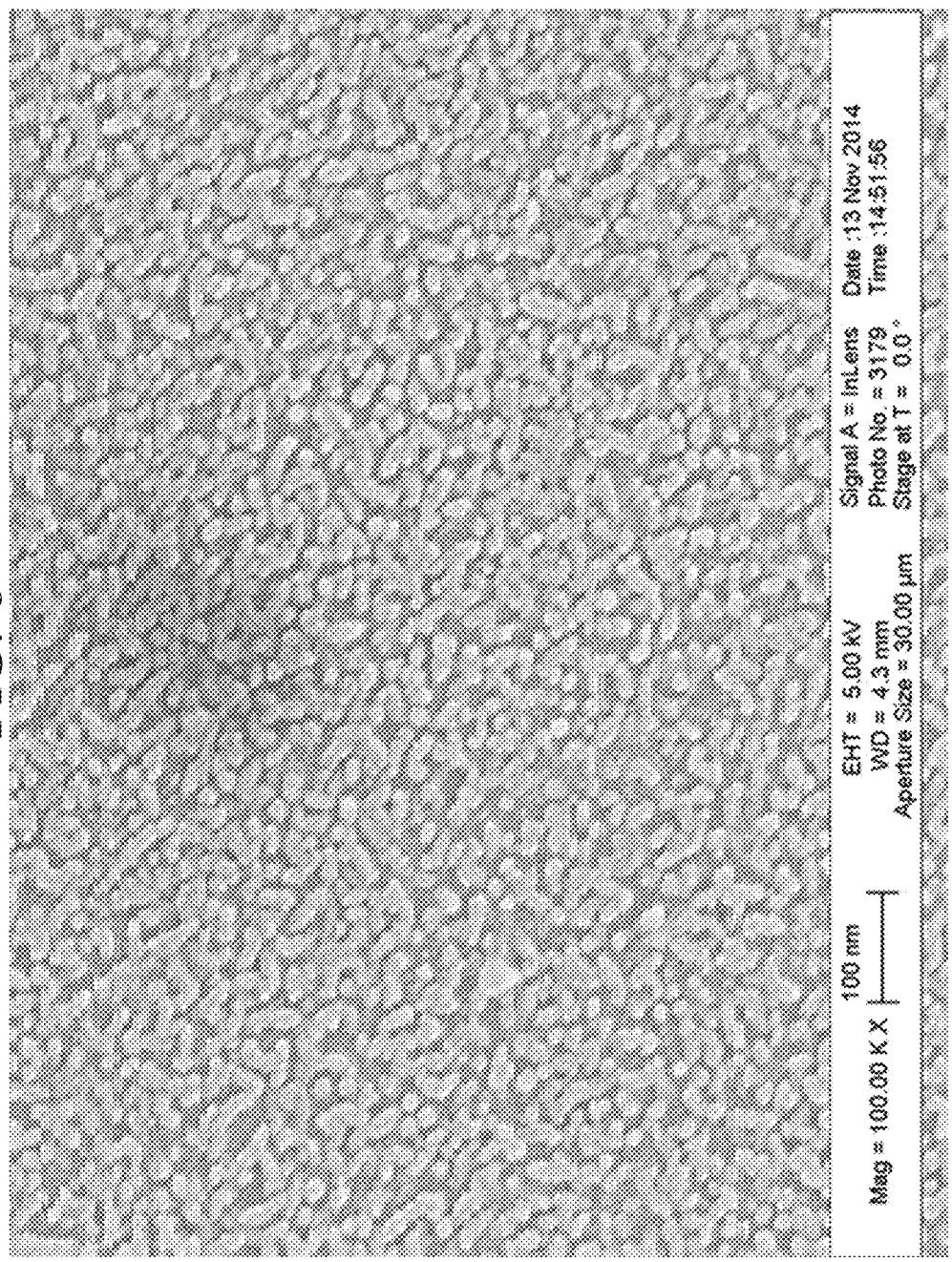
FIG. 6 shows a scanning electron microscope image of glass-based material 1.

As shown in Table 2, the Glass-based Materials 1-5 exhibited high transmittance (i.e., greater than about 90%/mm) and a high fracture toughness (i.e., greater than about 1.3 MPa·m$^{1/2}$). FIG. 6 shows an image of Glass-based Material 1, formed using Ceramming Schedule B, taken by SEM. The mullite crystals observed had an elongated form. Without being bound by theory, it is believed that the crystal shape may contribute to the observed increased fracture toughness.

TABLE 1

Compositions 1-5.

|  | Composition 1 | | Composition 2 | | Composition 3 | | Composition 4 | | Composition 5 | |
| --- | --- | --- | --- | --- | --- | --- | --- | --- | --- | --- |
|  | Mol % | Wt % | Mol % | Wt % | Mol % | Wt % | Mol % | Wt % | Mol % | Wt % |
| SiO$_2$ | 59.85 | 53 | 59.85 | 50.92 | 59.85 | 53.55 | 59.85 | 51.21 | 61.35 | 54.37 |
| Al$_2$O$_3$ | 16.64 | 25 | 16.64 | 24.03 | 16.64 | 25.26 | 16.64 | 24.16 | 18.14 | 27.28 |
| B$_2$O$_3$ | 14.62 | 15 | 14.62 | 14.41 | 14.62 | 15.16 | 14.62 | 14.49 | 11.62 | 11.93 |
| Na$_2$O |  |  |  |  | 2.16 | 1.99 | 2.16 | 1.91 | 2.16 | 1.97 |
| K$_2$O | 2.16 | 3 | 2.16 | 2.88 |  |  |  |  |  |  |
| MgO | 6.73 | 4 |  |  | 6.73 | 4.04 |  |  | 6.73 | 4 |
| ZnO |  |  | 6.73 | 7.75 |  |  | 6.73 | 7.8 |  |  |
| SnO$_2$ |  |  |  |  |  |  | 0.2 | 0.43 | 0.2 | 0.44 |

TABLE 2

Measured properties of Glass-based Materials 1-5.

|  | Glass-based material 1 | Glass-based material 2 | Glass-based material 3 | Glass-based material 4 | Glass-based material 5 |
| --- | --- | --- | --- | --- | --- |
| Ceramming Schedule A | | | | | |
| Crystalline Phase (XRD) | Mullite structure | Mullite structure | Mullite structure | Mullite structure | Mullite structure |
| Mean size of Crystals (XRD) | | | | | |
| Density | 2.42 | | | | |
| K$_{1C}$ | 1.32 | | | | |
| Young's modulus (GPa) | 83 | | | | |
| Shear Modulus G GPa) | 34 | | | | |
| IFT (kgf) | 1-2 | | | | |
| Ceramming Schedule B | | | | | |
| Crystalline Phase (XRD) | Mullite structure | | Mullite structure* | Mullite structure* | Mullite structure* |
| Mean size of Crystals (XRD) | ~10 nm | | | | |
| Density | 2.41 | | 2.42 | | |
| K$_{1C}$ | 1.29 | | 1.35 | | |

TABLE 2-continued

Measured properties of Glass-based Materials 1-5.

|  | Glass-based material 1 | Glass-based material 2 | Glass-based material 3 | Glass-based material 4 | Glass-based material 5 |
|---|---|---|---|---|---|
| Young's modulus (GPa) | 83 | 84 |  |  |  |
| Shear Modulus G GPa) | 33 | 34 |  |  |  |
| IFT (kgf) | 1-1.5 |  |  |  |  |
| ROR (MPa) | 170 |  |  |  |  |
| Transmission (thickness mm/Y%) | 5/90.1 |  | 1/91.2 |  |  |
| CTE |  | 37 |  |  |  |

*Note:
XRD analysis showed the main crystalline phase as a mullite ($3Al_2O_3$—$2SiO_2$) structure. This structure may be a solid solution including some boron.

Composition 6 as set forth in Table 3 was prepared by mixing dry batch materials thoroughly and placing the batch materials in a platinum crucible. The platinum crucible was placed in a globar furnace for 6 hours at 1615° C. Patties of the melted glass were rolled to a thickness of 6 mm and annealed at 675° C. for 1 hour. The resulting glass was then cerammed according to Ceramming Schedule C in a resistance-heated furnace to form a second phase. Ceramming Schedule C included heat treating the glass at temperature of 820° C. ($T_N$) for 4 hours to nucleate the glass, followed by heat treating the glass at a temperature of 875° C. ($T_C$ for 4 hours. The heating rate between the nucleation temperature and the ceramming temperature was 5° C./minute.

TABLE 3

Composition 6

|  | Wt % | Mol % |
|---|---|---|
| $SiO_2$ | 66.1 | 70.52 |
| $Al_2O_3$ | 21.0 | 13.2 |
| MgO | 5.7 | 9.07 |
| $Li_2O$ | 1.9 | 4.08 |
| $ZrO_2$ | 4.8 | 2.5 |
| $Na_2O$ | 0.5 | 0.52 |
| $SnO_2$ | 0.3 | 0.13 |

Figure 7A:
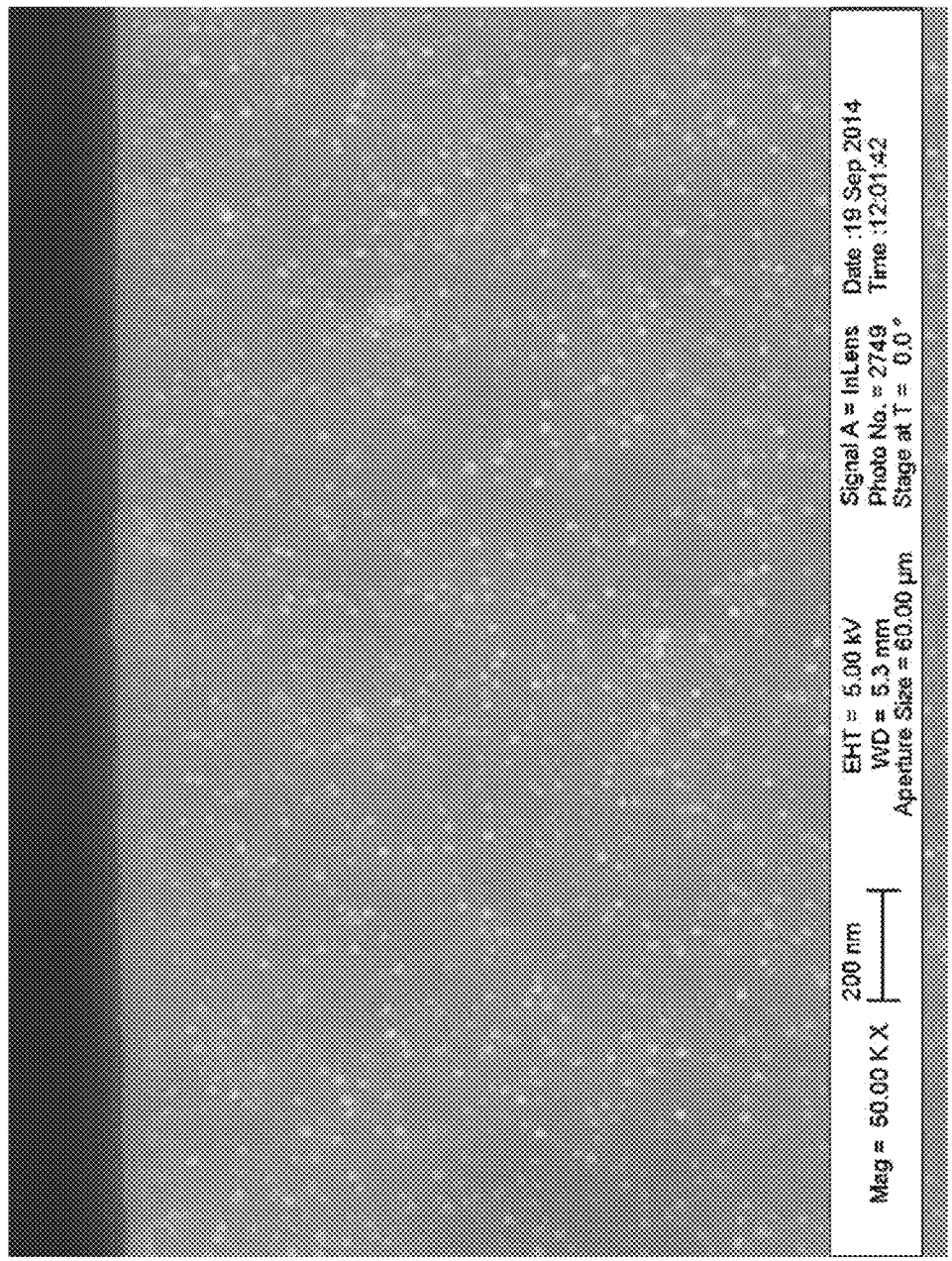
FIG. 7A shows a scanning electron microscope image of glass-based material 6, before being subjected to ion exchange.

As shown in Table 4, the resulting Glass-based Material 6 was transparent over the visible spectrum and highly crystalline (with less than 5 w % of the Glass-based Material 6 comprising residual glass). Glass-based Material 6 can b e characterized as including a second phase with a large proportion of fine-grained stuffed β-quartz solid solution crystals. The second phase was obtained by controlled crystallization of a MgO—$Li_2O$—$Al_2O_3$—$SiO_2$ glass containing appropriate amounts of nucleating agents such as $TiO_2$ and/or $ZrO_2$. FIG. 7A shows an image of Glass-based Material 6 taken by SEM. As shown in FIG. 7A, Glass-based Material 6 is highly crystalline and included stuffed β-quartz solid solution crystals having a dimension of 100 nm to about 150 nm.

Figure 7B:
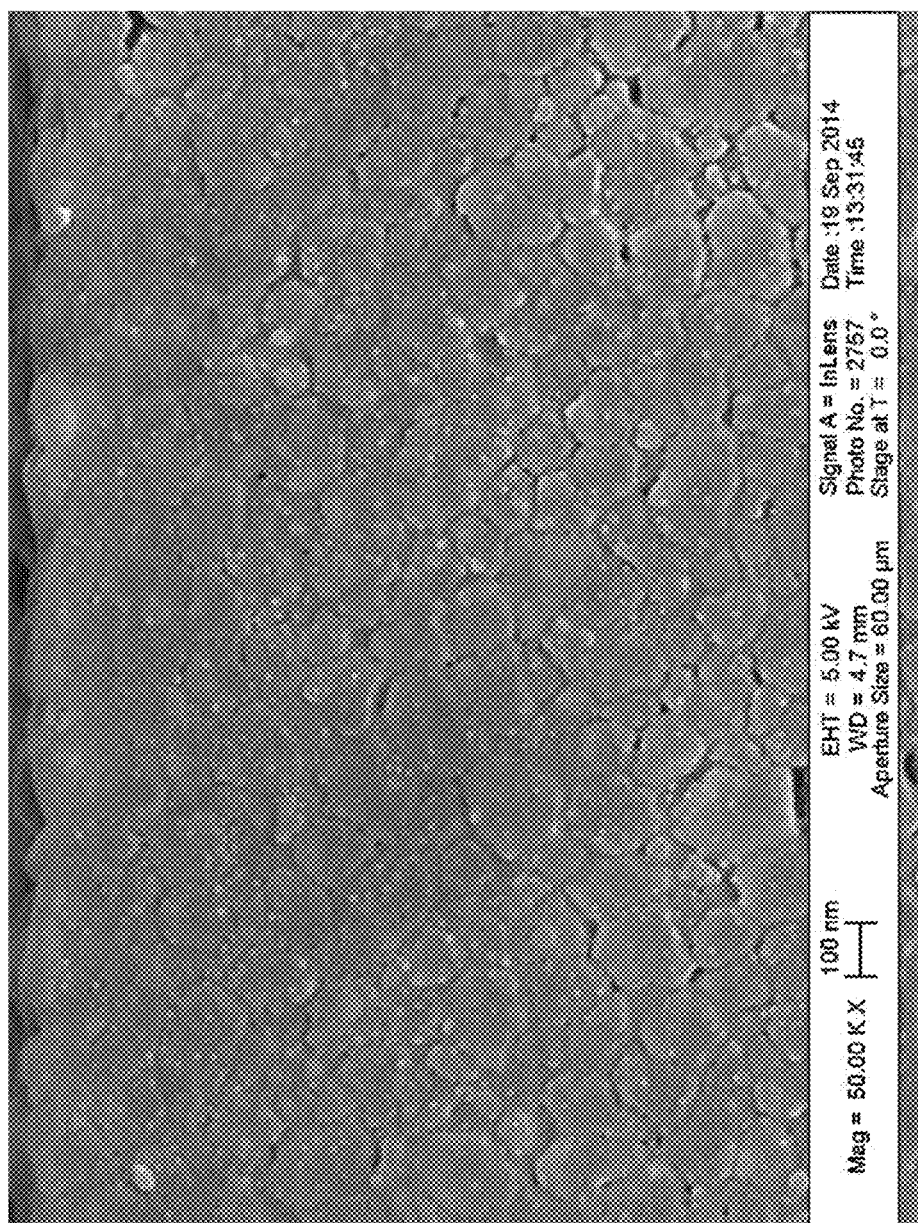
FIG. 7B shows a scanning electron microscope image of glass-based material 6, after being subjected to ion exchange.

Glass-based Material 6 was then chemically strengthened using molten salt bath including reagent grade of alkali metal salt included a mixture of 90% (by weight) $Li_2SO_4$-10% $K_2SO_4$. When glass-based materials including a second phase of stuffed β-quartz solid solution are immersed in molten lithium and or/ potassium salt baths, an ion-exchange reaction results in lithium from the molten salt bath replacing magnesium in the crystal lattice. The "crowding" of the surface resulting from the modification of lattice parameter of the solid solution creates a compressive stress and a surface compressive stress layer in the glass-based materials. Without being bound by theory, it is believed that such strengthened glass-based materials can exhibit up to a 5× increase in flexural strength. FIG. 7B shows the Glass-based Material 6 after ion exchange and being etched by hydrofluoric acid. As shown in FIG. 7B, the ion exchange process modifies the composition of the residual glass at the surface.

The properties of the resulting Glass-based Material 6 are shown in Table 4. The CTE value reported in Table 4 was measured over a temperature range from about 25° C. to about 700° C. The fracture toughness value ($K_{1C}$) was measured by Vickers indentation. Glass-based Material 6 was also examined using X-ray diffraction analysis, which showed the presence of a second phase including β-quartz crystals. The mean size of the crystals, as determined by Rietveld analysis, is also included in Table 4. The transmittance value provided is with respect to the visible wavelength range from about 400 nm to about 800 nm.

TABLE 4

Measured properties of Glass-based Material 6.

| Crystals (XRD) | β-quartz |
|---|---|
| β-quartz size (nm) | 97 |
| Zirconia (nm) | 5 |
| $K_1C$ (MPa · $m^{1/2}$) | 0.94 |
| E (GPa) | 96.6 |
| G (GPa) | 38.4 |
| Poisson ratio | 0.26 |
| IFT (Kgf) | 0.3 |
| Transmittance at thickness of 1.0 mm | 89.9% |

Influence of lithium bath temperature and ion exchange time on Glass-based Material 6 was studied. Samples 6A-6D of Glass-based Material 6 were each immersed in a molten bath including 90% (by weight) $Li_2SO_4$-10% $K_2SO_4$ according Table 5.

TABLE 5

Molten salt bath temperature and immersion time for Samples 6A-6D.

| Sample | 6A | 6B | 6C | 6D |
|---|---|---|---|---|
| Molten salt bath temperature (° C.) | 710 | 725 | 775 | 800 |
| Immersion time (hours) | 4 | 16 | 4 | 4 |

Figure 8:
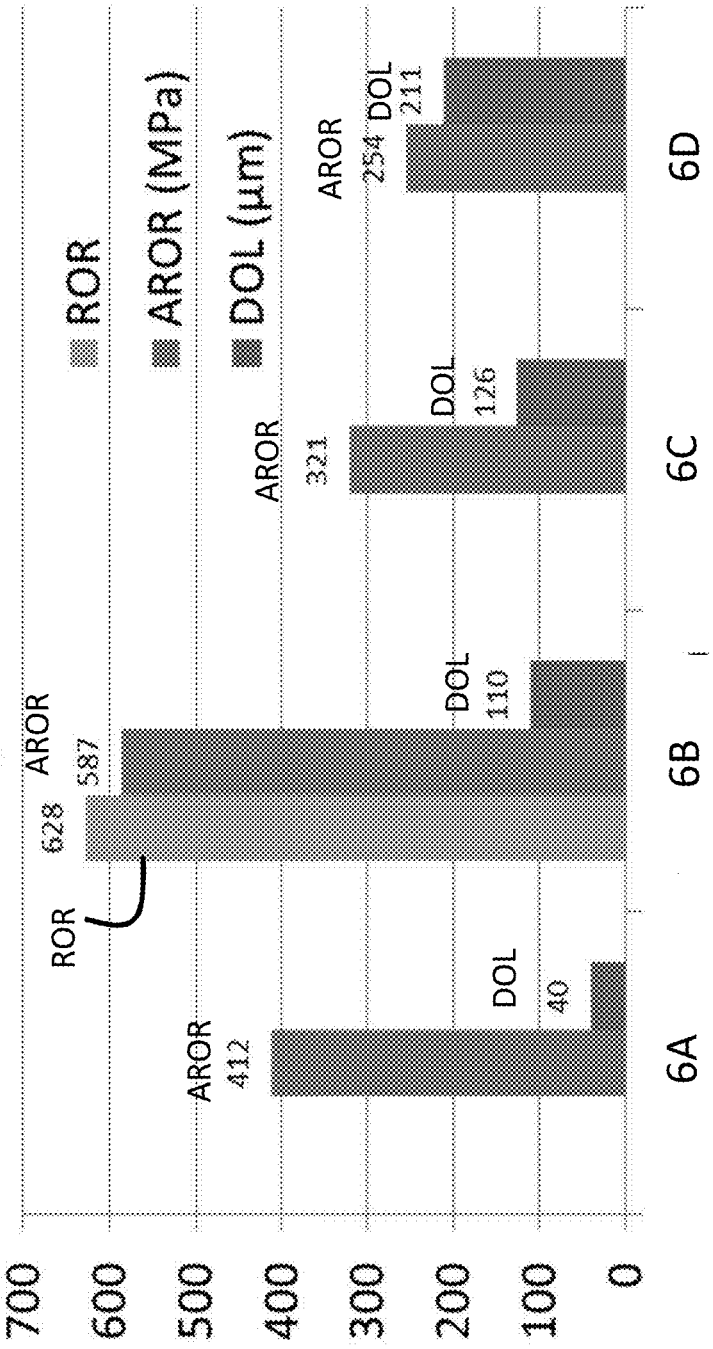
FIG. 8 is a graph showing the ROR strength, AROR strength and compressive stress layer depth data of strengthened Samples 6A-6D.

Samples 6A-6D each had a thickness of 2.1 mm and were tested for ROR and AROR (using 90 grit silicon carbide (SiC) particles that are delivered at 15 psi for 5 seconds). The DOL values of Samples 6A-6D were also measured. The ROR strength, AROR strength and DOL data of strengthened Samples 6A-6D are shown in FIG. 8. Sample 6B exhibited a favorable combination of strength and DOL (>100 μm).

The measured mechanical properties of Sample 6A are shown in Table 6. The compressive stress was measured by RNF. The hardness of Sample 6A was measured using a Knoop indenter at a 100 g load.

TABLE 6

Measured mechanical properties of Sample 6A.

|  | Before Strengthening | After Strengthening |
|---|---|---|
| CS (RNF) (MPa) | NA | 600 |
| DOL (μm) | NA | 40 |
| AROR (MPa) |  | 412 |
| Vickers IFT (kgf) | 0.3 | 5-6 |
| HK100 (MPa) | 652 MPa | 636 |
| Young's modulus (GPa) | 96.6 GPa | 98 |
| $K_{1C}$ (MPa · m$^{1/2}$) | 0.94 | NA |

Figure 9:
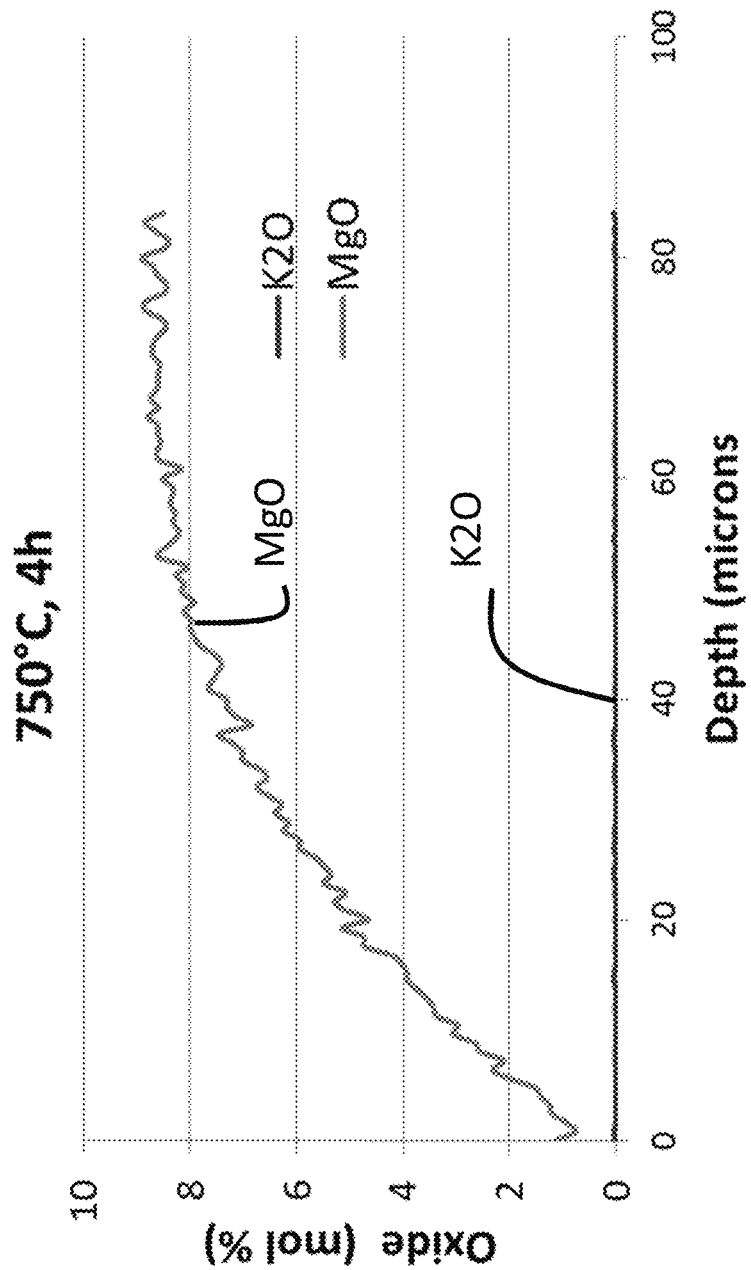
FIG. 9 shows an energy-dispersive X-ray (EDX) spectrum of Glass-based Material 6 after being chemically strengthened for 4 hours in a bath having a temperature of 750° C.
Figure 10:
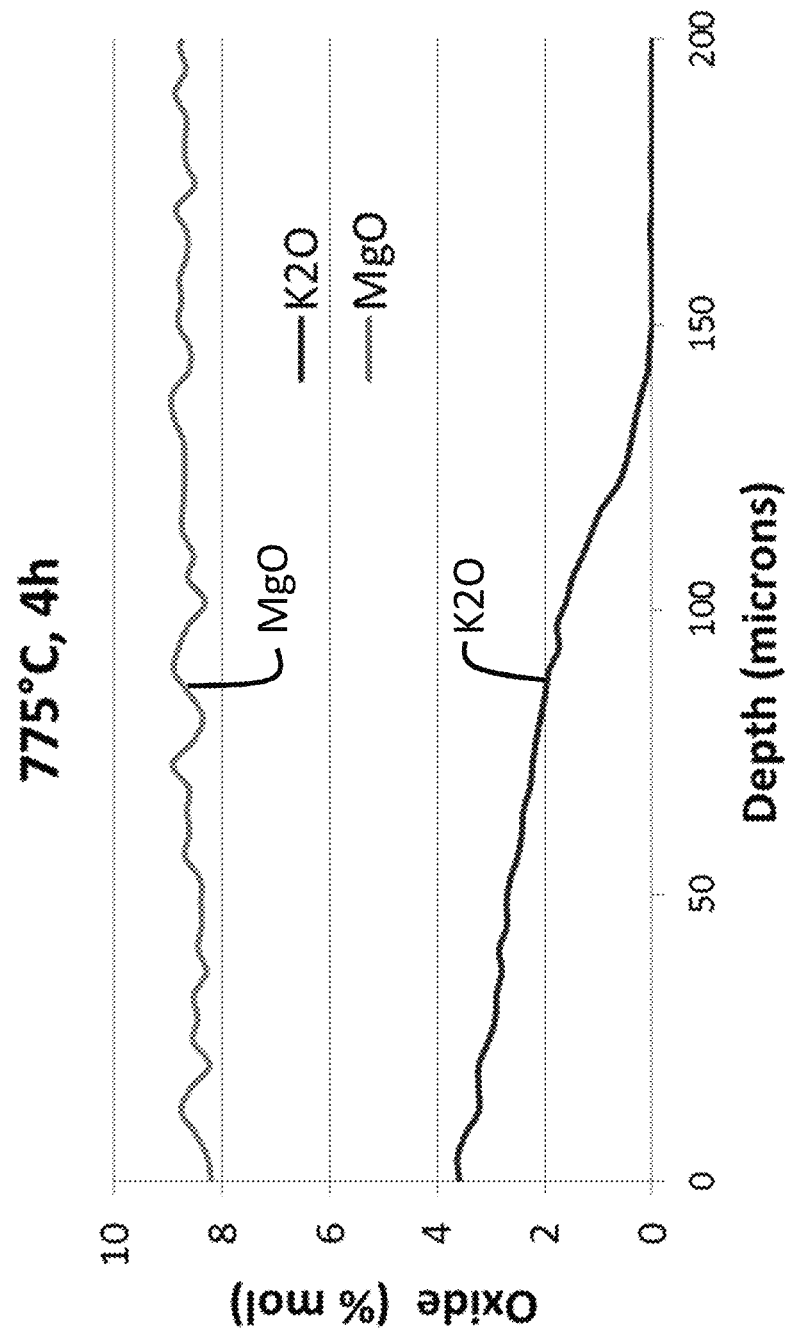
FIG. 10 shows an energy-dispersive X-ray (EDX) spectrum of Glass-based Material 6 after being chemically strengthened for 4 hours in a bath having a temperature of 775° C.

Without being bound by theory, it is believed that the cations involved in the interdiffusion process are not the same at low and high temperature and thus the strengthening effect is not the same. Sample 6E of Glass-based Material 6 was immersed in the same molten bath as Sample 6D but having a temperature of 750° C., for 4 hours. FIGS. 9-10 show EDX scan of the compressive stress layer of Samples 6E and 6D, respectively. At a "low bath temperature" (i.e., 750° C., Sample 6E), MgO diffuses out of the Glass-based Material, lithium from the molten s alt bath diffused into the Glass-based Material, and potassium from the molten salt bath does not diffuse at all. At a "higher bath temperature" (i.e., 775° C., Sample 6D), preferential diffusion of potassium from the molten salt bath occurs and magnesium is not believed to participate in the ion exchange. This difference of cations involved in the interdiffusion reactions implies a modification of strengthening principle. At "low temperature", compression occurs from crystal stuffing and at high temperature, compression arises from amorphization of the glass-ceramic following potassium diffusion. Strengthening through "crystal stuffing" is more efficient than amorphization and thus preferred.

The Knoop scratch threshold (KST) and scratch depth and width of Glass-based Materials 1 and 6B were tested. Glass-based Material 1 exhibited a KST in the range from about 5 N to about 6 N.

Figure 11:
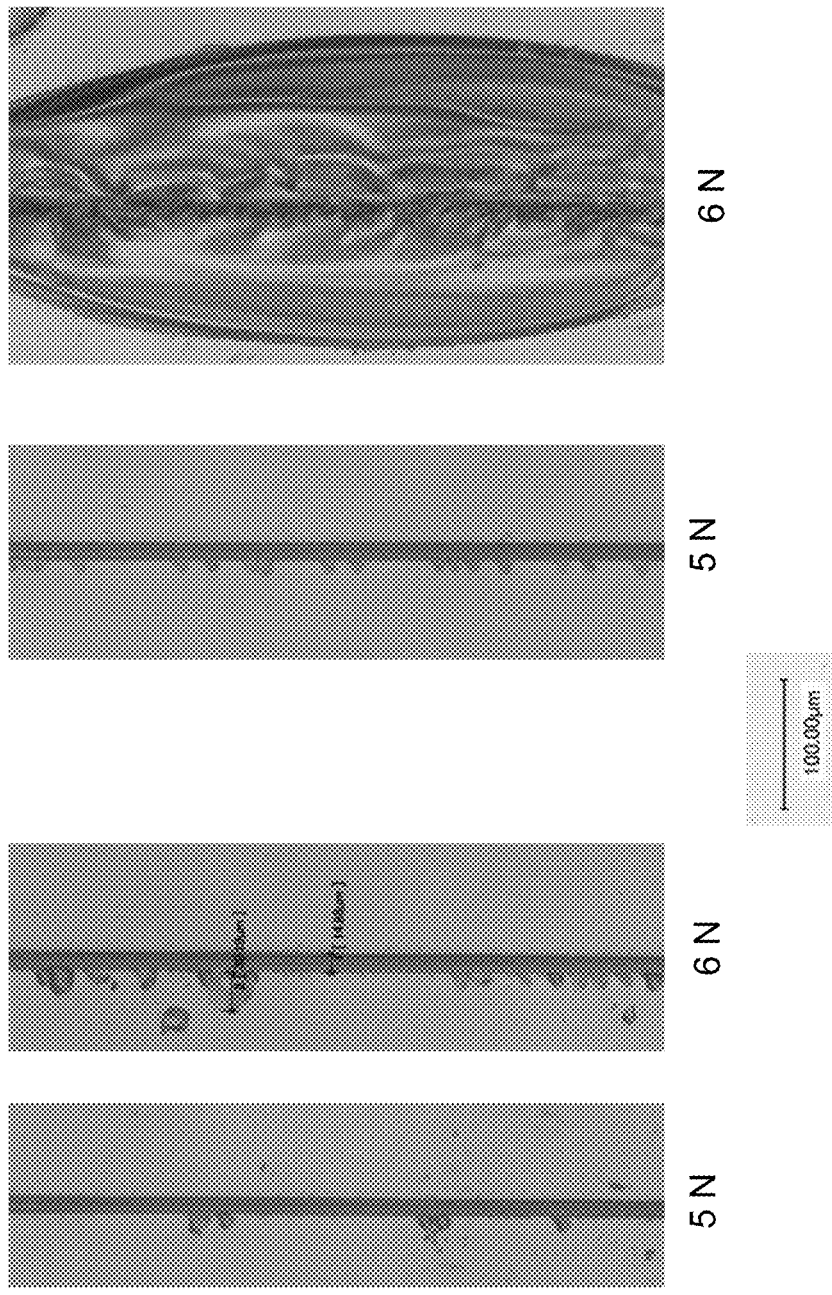
FIGS. 11A-11D are images Glass-based Material 1 after being scratched with a Knoop diamond at different loads.

Samples of Glass-based Material 1 were scratched at a rate of 0.4 mm/s with a Knoop diamond that is oriented so that the angle between the leading and trailing edges of the tip of the Knoop diamond is 172° 30' at a load of 5 N and 6 N, respectively. Images of the resulting scratches are shown in FIGS. 11A-11D. FIGS. 11A and 11B show the resulting scratch on the same sample at a load of 5 N and 6 N, respectively. FIGS. 11C and 11D show the resulting scratch on the same sample at a load of 5 N and 6 N, respectively. The measured depths of the scratches are shown in Table 7.

Samples of Glass-based Material 6B were scratched in the same manner using a Knoop diamond at different loads. The measured depths of the scratches are shown in Table 7.

TABLE 7

Scratch depth of Glass-based Materials 1 and 6B.

|  | Load | Scratch depth (micrometers) |
|---|---|---|
| Glass-based Material 6B | 0.25N | 0.176 |
| Glass-based Material 6B | 0.25N | 0.252 |
| Glass-based Material 6B | 0.5N | 4.2 |
| Glass-based Material 6B | 5N | 9.5 |
| Glass-based Material 6B | 6N | 14.9 |
| Glass-based Material 1 | 5N | 1.75 |
| Glass-based Material 1 | 6N | 2.1 |
| Glass-based Material 1 | 6N | 2.08 |
| Glass-based Material 1 | 6N | 18.6 |

Figure 12:
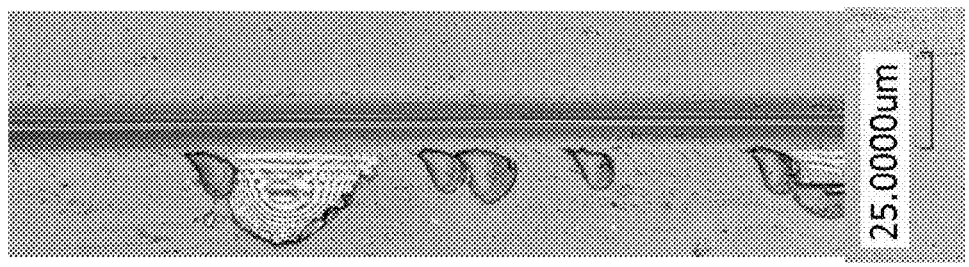
FIG. 12 is an enlarged image of Glass-based Material 1 after being scratched with a Knoop diamond at a load of 5 N.

FIG. 12 shows an image of Glass-based Material 1 after being scratched using a load of 5 N. The scratch has a width w of about 13 micrometers and chips having a size of up to 25 micrometers. Accordingly, Glass-based Material 1 shows the size of the chips is less than about 2 w. Accordingly, Glass-based material 1 is free of chips having a size greater than 2 w.

Figure 13:
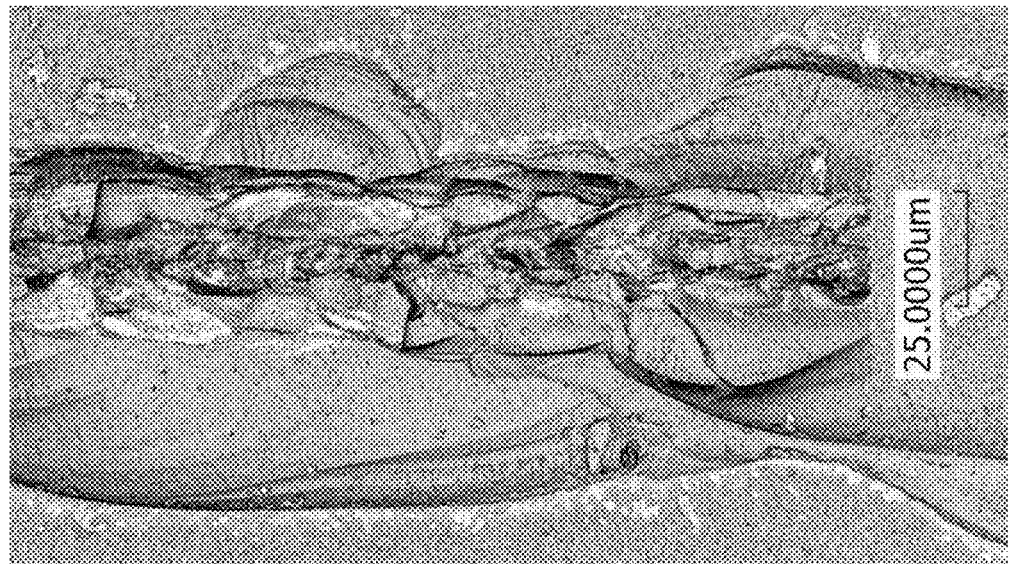
FIG. 13 is an enlarged image of Glass-based Material 6B after being scratched with a Knoop diamond at a load of 5 N.

FIG. 13 shows an image of Glass-based Material 6B after being scratched using a load of 5 N. As shown in Table 7, the scratch width including chips is 75.5 micrometers, and FIG. 13 shows the scratch width w (without chips) is about 25 micrometers. Accordingly, Glass-based Material 6B shows the size of the chips is about 3 w. Accordingly, Glass-based material 6B is free of chips having a size greater than 3 w.

Compositions 7-12 as set forth in Table 8 were prepared by mixing dry batch materials thoroughly and placing the batch materials in a platinum crucible. The platinum crucible was placed in a globar furnace for 6 hours at 1615° C. Patties of the melted glass were rolled to a thickness of 6 mm and annealed at 675° C. for 1 hour. The resulting glass was then cerammed in a resistance-heated furnace to form a second phase.

TABLE 8

Compositions 7-12 and DOL for Glass-based Materials 7-12.

|  | 7 | | 8 | | 9 | | 10 | | 11 | | 12 | |
|---|---|---|---|---|---|---|---|---|---|---|---|---|
|  | Mol % | Wt % | Mol % | Wt % | Mol % | Wt % | Mol % | Wt % | Mol % | Wt % | Mol % | Wt % |
| SiO2 | 70.6 | 66.1 | 70.6 | 66.2 | 70.6 | 66.0 | 70.6 | 65.9 | 74.0 | 69.8 | 65.8 | 61.0 |
| Al2O3 | 13.2 | 21.0 | 13.2 | 21.0 | 13.2 | 21.0 | 13.2 | 20.9 | 11.7 | 18.7 | 15.4 | 24.2 |
| MgO | 9.1 | 5.7 | 8.1 | 5.1 | 10.1 | 6.3 | 11.1 | 6.9 | 8.1 | 5.1 | 10.6 | 6.6 |
| ZrO2 | 2.5 | 4.8 | 2.5 | 4.8 | 2.5 | 4.8 | 2.5 | 4.8 | 2.2 | 4.3 | 2.9 | 5.5 |

TABLE 8-continued

Compositions 7-12 and DOL for Glass-based Materials 7-12.

| | 7 | | 8 | | 9 | | 10 | | 11 | | 12 | |
|---|---|---|---|---|---|---|---|---|---|---|---|---|
| | Mol % | Wt % | Mol % | Wt % | Mol % | Wt % | Mol % | Wt % | Mol % | Wt % | Mol % | Wt % |
| Li2O | 4.1 | 1.9 | 5.1 | 2.4 | 3.1 | 1.4 | 2.1 | 1.0 | 3.6 | 1.7 | 4.7 | 2.2 |
| Na2O | 0.50 | 0.48 | 0.50 | 0.48 | 0.50 | 0.48 | 0.50 | 0.48 | 0.44 | 0.4 | 0.58 | 0.6 |
| DOL @ 725° C., 4 h (microns) | 50 | | 49 | | 49 | | 47 | | 57 | | 116 | |

The resulting Glass-based Materials 7-12 were then chemically strengthened using molten salt bath including reagent grade of alkali metal salt included a mixture of 90% (by weight) $Li_2SO_4$-10% $K_2SO_4$ and a temperature of 725° C. The Glass-based Materials were immersed in the molten salt bath for 4 hours. The resulting depths of compressive stress layer (DOL) are shown in Table 8.

Figure 14:
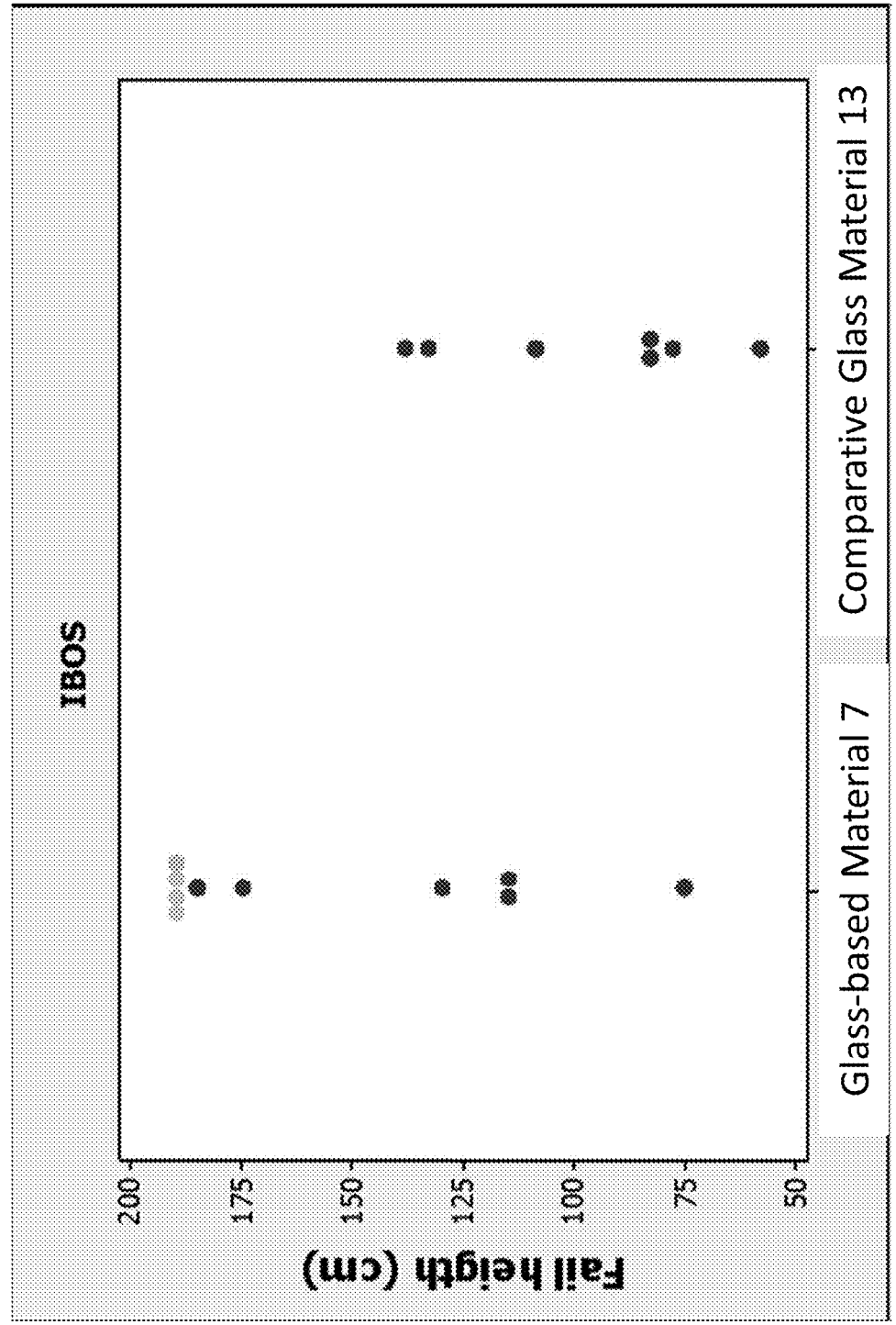
FIG. 14 is a graph showing IBoS results for Glass-based Material 7 and Comparative Glass Material 13.

Ten samples of Glass-based Material 7, having a thickness of 0.8 mm were chemically strengthened to exhibit a compressive stress of 900 MPa and DOL of 100 micrometers. The samples were then subjected to the IBoS test, using a 4.2 g ball and 30-grit sandpaper. As shown in FIG. 14, four of the ten samples did not fail at the maximum drop height of 190 cm. The results are compared to the drop test results of a known glass substrate ("Comparative Glass Material 13") (having no second phase) having a nominal composition of 58 mol % $SiO_2$, 16.5 mol % $Al_2O_3$, 16.7 mol % $Na_2O$, 2.8 mol % MgO, 6.5 mol % $P_2O_5$ and 0.05 mol % $SnO_2$, and thickness of 0.8 mm. Ten samples of Comparative Glass Material 13 were chemically strengthened to exhibit a compressive stress of 865 MPa and DOL of 97 micrometers. As shown in FIG. 14, none of the samples of Comparative Glass Material 13 survived beyond a drop height of 150 cm.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making a glass-ceramic material, comprising:
   ceramming a glass to produce a glass phase and ceramic phase dispersed within the glass phase, thereby forming the glass-ceramic material;
   wherein the glass-ceramic material has a transmittance of at least 88%/mm over a visible spectrum ranging from 400 nm to 700 nm,
   wherein the ceramic phase comprises at least one of mullite, spinel, β-quartz, petalite, lithium disilicate, β-spodumene, nepheline, and alumina,
   wherein the glass phase comprises at least one of a soda lime glass, an alkali aluminosilicate glass, and a lithium alumina silicate glass, and
   wherein the glass-ceramic material has a fracture toughness of at least 0.9 $MPa \cdot m^{1/2}$.

2. The method of claim 1, wherein the ceramming comprises heat treating the glass.

3. The method of claim 2, wherein the heat treating is to a nucleation temperature and then to a ceramming temperature.

4. The method of claim 1, wherein a surface of the glass-ceramic material, when scratched with a Knoop diamond at a load of at least 5 N to form a scratch having a width w, is free of chips having a size of greater than 3 w.

5. The method of claim 1, wherein crystallites of the ceramic phase are sufficiently small in dimension to provide transparency and wherein a difference in refractive index between the glass phase and the ceramic phase is less than 0.5 and greater than 0.025.

6. The method of claim 5, wherein the crystallites of the ceramic phase have a major dimension of less than about 100 nm.

7. The method of claim 1, wherein the glass-ceramic material has a retained strength after abrasion of at least 250 MPa as measured by abraded ring-on-ring testing.

8. The method of claim 1, wherein the glass-ceramic material has a coefficient of thermal expansion of less than $45 \times 10^{-7} K^{-1}$.

9. The method of claim 1, wherein the glass-ceramic material has a Young's modulus in a range from 80 GPa to 100 GPa.

10. The method of claim 1, wherein the ceramic phase comprises particles having a mean size in a range from 5 nm to 200 nm.

11. The method of claim 1, wherein a volume fraction of the ceramic phase in the glass-ceramic material is in a range from 10% to 98%.

12. The method of claim 1, wherein the glass phase comprises:
   55 to 75 mol % $SiO_2$;
   10 to 20 mol % $Al_2O_3$;
   0 to 16 mol % $B_2O_3$;
   0 to 4 mol % $Na_2O$;
   0 to 4 mol % $K_2O$;
   0 to 8 mol % $Li_2O$;
   0 to 12 mol % MgO;
   0 to 10 mol % ZnO;
   0 to 5 mol % $ZrO_2$; and
   0 to 0.5 mol % $SnO_2$.

13. The method of claim 1, further comprising chemically strengthening the glass-ceramic wherein the glass-ceramic material is ion exchanged.

14. The method of claim 1, wherein the glass-ceramic material has a thickness of less than or equal to 1 mm.

15. A method of making a consumer electronic product comprising:
   using the glass-ceramic material of claim 1 as a cover plate or housing for the consumer electronic product.

16. A method of making a glass-ceramic material, comprising:
   ceramming a glass to produce a glass phase and ceramic phase dispersed within the glass phase, thereby forming the glass-ceramic material;

wherein the glass-ceramic material has a transmittance of at least 88%/mm over a visible spectrum ranging from 400 nm to 700 nm, wherein the ceramic phase comprises at least one of mullite, spinel, β-quartz, petalite, lithium disilicate, β-spodumene, nepheline, and alumina, wherein the glass phase comprises at least one of a soda lime glass, an alkali aluminosilicate glass, and a lithium alumina silicate glass, and wherein the glass-ceramic material has a fracture toughness of at least 0.9 MPa·m$^{1/2}$, wherein a difference in refractive index between the glass phase and the ceramic phase is less than 0.5 and greater than 0.025, wherein the ceramic phase comprises particles having a mean size in a range from 5 nm to 200 nm.

17. The method of claim 16, wherein the particles are crystallites having a major dimension of less than about 100 nm.

18. A method of making a glass-ceramic material, comprising:

ceramming a glass to produce a glass phase and ceramic phase dispersed within the glass phase, thereby forming the glass-ceramic material;

wherein the glass-ceramic material has a transmittance of at least 88%/mm over a visible spectrum ranging from 400 nm to 700 nm, wherein the ceramic phase comprises at least one of mullite, spinel, β-quartz, petalite, lithium disilicate, β-spodumene, nepheline, and alumina, wherein the glass phase comprises at least one of a soda lime glass, an alkali aluminosilicate glass, and a lithium alumina silicate glass, and wherein the glass-ceramic material has a fracture toughness of at least 0.9 MPa·m$^{1/2}$;

wherein the glass-ceramic material has a thickness of less than or equal to 1 mm;

wherein a volume fraction of the ceramic phase in the glass-ceramic material is in a range from 10% to 98%; and chemically strengthening the glass-ceramic wherein the glass-ceramic material is ion exchanged.

19. The method of claim 18, wherein a difference in refractive index between the glass phase and the ceramic phase is less than 0.5 and greater than 0.025.

20. The method of claim 19, wherein crystallites of the ceramic phase have a major dimension of less than about 100 nm.

* * * * *